United States Patent [19]

Yamamoto et al.

[11] Patent Number: 5,543,460
[45] Date of Patent: Aug. 6, 1996

[54] GRAFT COPOLYMER PARTICLES THEIR PRODUCTION AND COMPOSITIONS COMPRISING THEM

[75] Inventors: Naoki Yamamoto; Akira Yanagase, both of Otake; Tadashi Iwasaki, Kawasaki; Masakazu Itoh, Otake, all of Japan

[73] Assignee: Mitsubishi Rayon Co., Ltd., Tokyo, Japan

[21] Appl. No.: 465,130

[22] Filed: Jun. 5, 1995

Related U.S. Application Data

[63] Continuation of Ser. No. 133,084, Oct. 6, 1993, abandoned.

[30] Foreign Application Priority Data

| Feb. 6, 1992 | [JP] | Japan | 4-021333 |
|---|---|---|---|
| Mar. 10, 1992 | [JP] | Japan | 4-051705 |
| Mar. 10, 1992 | [JP] | Japan | 4-051706 |
| Mar. 13, 1992 | [JP] | Japan | 4-055508 |
| Sep. 21, 1992 | [JP] | Japan | 4-251610 |
| Sep. 25, 1992 | [JP] | Japan | 4-256365 |
| Sep. 29, 1992 | [JP] | Japan | 4-259801 |
| Sep. 30, 1992 | [JP] | Japan | 4-261324 |

[51] Int. Cl.$^6$ ............................ C08G 77/04
[52] U.S. Cl. ............ 525/64; 525/66; 525/68; 525/70; 525/77; 525/80; 528/26
[58] Field of Search .................. 525/64, 66, 68, 525/70, 77, 80, 479; 528/26

[56] References Cited

U.S. PATENT DOCUMENTS

| 4,690,986 | 9/1987 | Sasaki et al. | 525/479 |
|---|---|---|---|
| 4,885,209 | 12/1989 | Lindner et al. | 428/420 |
| 4,894,415 | 1/1990 | Sasaki et al. | 525/68 |
| 5,106,908 | 4/1992 | Alsmarraie et al. | 525/479 |
| 5,219,932 | 6/1993 | Yamamoto et al. | 525/479 |

FOREIGN PATENT DOCUMENTS

| 0246537 | 11/1987 | European Pat. Off. . |
|---|---|---|
| 3307963 | 3/1989 | European Pat. Off. . |
| 62-280210 | 12/1987 | Japan . |
| 63-69859 | 3/1988 | Japan . |
| 1-279954 | 11/1989 | Japan . |
| 3-231907 | 10/1991 | Japan . |

*Primary Examiner*—Mark D. Sweet
*Attorney, Agent, or Firm*—Cushman Darby & Cushman

[57] ABSTRACT

Graft copolymer particles obtained by graft-polymerizing one or more kinds of vinyl monomer onto a compound rubber comprising a polyorganosiloxane component and an alkyl (meth)acrylate rubber component, which graft copolymer particle has a number average particle size of 0.01 to 0.07 μm, the volume of particles larger than 0.10 μm being 20% or less of the whole particle volume, a method for producing the above graft copolymer particle, wherein one or more kinds of vinyl monomer are graft-polymerized onto a compound rubber obtained by polymerizing an alkyl (meth)acrylate rubber component comprising alkyl (meth)acrylate and a polyfunctional alkyl (meth)acrylate with a polyorganosiloxane having a number average particle size of 0.003 to 0.06 μm, the volume of particles larger than 0.10 μm being 20% or less of the whole particle volume, and thermoplastic resin compositions comprising the above graft copolymer and various thermoplastic resins.

The present invention provides graft copolymer particles and their thermoplastic resin composition which can give molded products having both excellent pigment colorability and extremely high impact resistance.

7 Claims, No Drawings

GRAFT COPOLYMER PARTICLES THEIR PRODUCTION AND COMPOSITIONS COMPRISING THEM

This is a continuation of application No. 08/133,084, filed as PCT/JP83/00145, Feb. 5, 1993 published as WO93/16119, Aug. 19, 1993, which was abandoned upon the filing hereof.

TECHNICAL FIELD

The present invention relates to a high impact resin excellent in impact resistance and pigment colorability.

BACKGROUND ART

Hitherto, various endeavors have been made in order to enhance the performance of high impact resins. For example, U.S. Pat. No. 4,690,986 discloses that, with a notice given to lowering in glass transition temperature and modulus of elasticity of a rubber layer, investigation was carried out to utilize polyorganosiloxane rubbers having both a low glass transition temperature and a low modulus of elasticity as a rubber source for the high impact resins. However, this method cannot improve a mat and bad surface appearance owing to the polyorganosiloxane rubbers. Also, when such the rubbers are used, their small particle size lowers the impact resistance, so that those having a large particle size are used.

In order to improve the surface appearance of resin molded products, U.S. Pat. No. 4,894,415 proposes a compound rubber graft copolymer produced by graft-polymerizing a vinyl monomer onto a compound rubber comprising a polyorganosiloxane rubber and a poly(meth)acrylic rubber.

Also, Japanese Patent Application Kokai No. 62-280210 proposes a graft copolymer composed of the core of a crosslinked silicone rubber, the first shell of a crosslinked acrylate rubber and the second shell comprising the graft component of a vinyl polymer.

Further, U.S. Pat. No. 4,885,209 proposes a graft polymer produced by graft-polymerizing an ethylenic unsaturated monomer onto a rubber comprising the core of a crosslinked acrylate rubber, etc. and the shell of a polyorganosiloxane.

However, in the specifications of Japanese Patent Application Kokai No. 62-280210 and U.S. Pat. No. 4,885,209, reference is made to the graft polymer having a number average particle size of 0.05 µm or more, but the examples of the specifications disclose only those having a particle size as large as 0.15 to 0.42 µm, making completely no reference to a specific means for producing those having a particle size of 0.10 µm or less.

Also, a compound rubber graft copolymer disclosed in U.S. Pat. No. 4,894,415, because of its compound rubber component having a particle size larger than 0.07 µm, is poor in colorability by addition of pigments, so that it is low in commercial value. Because of this, there is a strong demand for the development of high impact resins having both a good impact resistance and an excellent colorability by addition of pigments.

The present inventors have made an extensive study on a relationship between the particle size and colorability by addition of pigments of the graft copolymer. As a result, they have found that by using a polyorganosiloxane having an extremely small particle size and producing the compound rubber of this polyorganosiloxane with a poly(meth)acrylate rubber, having an extremely small particle size, the graft copolymer particle obtained from this compound rubber shows both an excellent impact resistance and a good pigment colorability.

DISCLOSURE OF THE INVENTION

A gist of the present invention is graft copolymer particles obtained by graft-polymerizing one or more kinds of vinyl monomer onto a compound rubber comprising a polyorganosiloxane component and an alkyl (meth)acrylate rubber component, which graft copolymer particle has a number average particle size of 0.01 to 0.07 µm, the volume of particles larger than 0.10 µm being 20% or less of the whole particle volume. Another gist of the present invention is a method for producing the above graft copolymer particles by graft-polymerizing one or more kinds of vinyl monomer onto a compound rubber obtained by polymerizing an alkyl (meth)acrylate rubber component comprising an alkyl (meth)acrylate and a polyfunctional alkyl (meth)acrylate with a polyorganosiloxane particle having a number average particle size of 0.003 to 0.06 µm, the volume of particles larger than 0.10 µm being 20% or less of the whole particle volume.

A further gist of the present invention is a thermoplastic resin composition comprising the above graft copolymer particles and various thermoplastic resins.

BEST MODE FOR CARRYING OUT THE INVENTION

The graft copolymer particles of the present invention have a number average particle size ranging from 0.01 to 0.07 µm, preferably 0.01 to 0.06 µm, and the volume of particles larger than 0.10 µm is 20% or less, preferably 10% or less of the volume of the whole graft compound rubber particles. When the number average particle size is smaller than 0.01 µm, molded products obtained from the resin composition become poor in impact resistance. When the number average particle size is larger than 0.07 µm, the scattering of light by the particles becomes so remarkable that the pigment colorability of the molded products becomes poor.

The graft compound rubber of the present invention has a structure in which the vinyl monomer has been graft-polymerized onto the compound rubber in a state wherein the polyorganosiloxane component and polyalkyl (meth)acrylate rubber component are substantially inseparable from each other. This compound rubber may take various forms, for example, a form in which the both components have been mixed and dispersed almost uniformly; a form in which the polyalkyl (meth)acrylate rubber component has been dispersed in the polyorganosiloxane to form a salami structure; a form in which the polyorganosiloxane and polyalkyl (meth)acrylate have been arranged in a stratified form; and the like. These forms may properly exist in mixture. Examples of the stratified form include a form in which the first layer of the polyorganosiloxane and second layer of the polyalkyl (meth)acrylate exist on the core of the polyalkyl (meth)acrylate, and a form in which the first layer of the polyalkyl (meth)acrylate and second layer of the polyorganosiloxane exist on the core of the polyorganosiloxane.

The polyorganosiloxane used in the present invention can be obtained, for example, as follows: An organosiloxane mixture containing a diorganosiloxane and optionally a siloxane crosslinking agent and a siloxane graft-linking agent is emulsified with an emulsifier and water to prepare a latex; this latex is made fine with a homomixer by shear force generated by high-speed rotation or a homogenizer making particles fine by jet force of a high pressure generator; the latex is dropped at a definite rate to an aqueous dodecylbenzenesulfonic acid solution kept at a high temperature to effect polymerization; and then the dodecylbenzenesulfonic acid is neutralized with an alkaline substance.

The size of the polyorganosiloxane is not critical, but it is preferred that the number average particle size is 0.003 to 0.06 μm, and that the volume of particles larger than 0.10 μm is 20% or less of the whole particle volume.

Such the polyorganosiloxane having a small size and a narrow width of particle size distribution can be obtained by polymerizing the fine latex while dropping the latex at an extremely slow rate to an aqueous dodecylbenzenesulfonic acid solution kept at 50° C. or more, the concentration of the solution being as low as 3 to 50 wt. %. The higher the concentration of the aqueous acid solution becomes, the finer the latex.

It is desirable to produce the polyorganosiloxane latex having a number average particle size of 0.003 to 0.06 μm, the volume of particles larger than 0.10 μm being 20% or less of the whole particle volume by stirring and emulsifying an organosiloxane mixture containing an organosiloxane and optionally a siloxane crosslinking agent and a siloxane graft-linking agent to prepare a latex, and polymerizing the latex while dropping the latex at 50° C. or more to an aqueous solution in which an alkylbenzenesulfonic acid of 3 wt. % or more of the organosiloxane mixture has been dissolved.

The organosiloxane used in the present invention includes three or more-membered cyclic organosiloxanes, among which three to six-membered ones are preferred. Specifically, there are given hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. These cyclic organosiloxanes are used alone or in mixture of two or more of them. The amount of these cyclic organosiloxanes used is preferably 50 wt. % or more, more preferably 70 wt. % or more of the organosiloxane mixture.

The siloxane crosslinking agent includes trifunctional or tetrafunctional silane crosslinking agents, for example, trimethoxymethylsilane, triethoxyphenylsilane, tetramethoxysilane, tetraethoxysilane, tetra-n-propoxysilane, tetrabutoxysilane and the like. Particularly, tetrafunctional crosslinking agents are preferred, among which tetraethoxysilane is most preferred. The amount of the crosslinking agent used is 0 to 30 wt. % of the organosiloxane mixture.

The siloxane graft-linking agent includes compounds which can form a unit represented by either one of the following formulae:

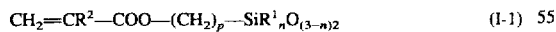

$$CH_2=CR^2—COO—(CH_2)_p—SiR^1{}_nO_{(3-n)2} \quad (I-1)$$

$$CH_2=CH—SiR^1{}_nO_{(3-n)/2} \quad (I-2)$$

$$HS—(CH_2)_p—SiR^1{}_nO_{(d-n)/2} \quad (I-3)$$

or

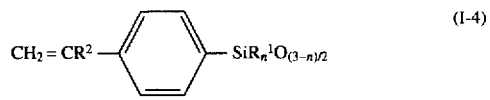

(I-4)

wherein $R^1$ represents a methyl, ethyl, propyl or phenyl group, $R^2$ represents a hydrogen atom or a methyl group, n represents an integer of 0, 1 or 2, and p represents an integer of 1 to 6.

Among these, (meth)acryloyloxysiloxane which can form the unit represented by the formula (I-1), because of its high grafting efficiency, can form effective graft chains, so that it is advantageous in terms of development of impact resistance.

As those which can form the unit represented by the formula (I-1), methacryloyloxysiloxane is particularly preferred. Specific examples of the methacryloyloxysiloxane include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilane and the like.

Those which can form the unit of the formula (I-2) include vinylsiloxanes, and specific examples thereof include tetramethyltetravinylcyclotetrasiloxane. Those which can form the unit of the formula (I-3) include γ-mercaptopropyldimethoxymethylsilane, γ-mercaptopropylmethoxydimethylsilane, γ-mercaptopropyldiethoxymethylsilane and the like.

Those which can form the unit of the formula (I-4) include p-vinylphenyldimethoxymethylsilane.

The amount of the graft-linking agent contained in the organosiloxane mixture is 0 to 10 wt. %.

In the present invention, the latex is produced by adding an emulsifier and water to the organosiloxane mixture containing the organosiloxane and optionally the siloxane crosslinking agent and siloxane graft-linking agent.

Those which are preferred as the emulsifier are anionic ones, and there is used an emulsifier selected from sodium alkylbenzenesulfonate, sodium laurylsulfonate, sodium sulfosuccinate, the sodium salt of polyoxyethylene nonylphenyl ether sulfuric ester and the like. Particularly, sulfonic acid emulsifiers such as sodium alkylbenzenesulfonate, sodium laurylsulfonate and the like are preferred.

These emulsifiers are used in a range of 0.05 to 5 wt. % based on the organosiloxane mixture. When the amount is less than 0.05 wt. %, the dispersion state becomes unstable, and when it exceeds 5 wt. %, coloration owing to the emulsifier becomes remarkable. Such the amounts are not therefore preferred.

Usually, the amount of water added to the organosiloxane mixture and emulsifier is preferably in a range of 1.5 to 9 times that of the organosiloxane mixture. When the amount is below this range, the dispersion state becomes unstable, there being a tendency that the polyorganosiloxane latex having a stabilized particle size is not obtained. When water is added in amounts more than this range, the resulting polyorganosiloxane lowers in concentration, so that it becomes unsuitable as a material for graft polymerization.

For mixing the organosiloxane mixture, emulsifier and water, there are a method using high-speed stirring, a method using high-pressure emulsifying apparatus such as a homogenizer, and the like. The method using a homogenizer is preferred because it makes narrow the particle size distribution of the polyorganosiloxane latex.

The alkylbenzenesulfonic acid shows both actions to catalyze the polycondensation of the organosiloxane mixture and to emulsify the mixture. Among alkylbenzenesulfonic acids, aliphatic group-substituted benzenesulfonic acids are preferred in that they are also superior in an action to stabilize the organosiloxane latex. Particularly, n-dodecylbenzenesulfonic acid is preferred. When n-dodecylbenzenesulfonic acid is used together with a mineral acid (e.g. sulfuric acid), coloration owing to the emulsifier component can be decreased.

The amount of the alkylbenzenesulfonic acid is determined in connection with the amount of the organosiloxane mixture. That is, the alkylbenzenesulfonic acid is used in amounts of 3 to 15 wt. % of the organosiloxane mixture. When the amount of the alkylbenzenesulfonic acid is below this range, the volume of particles having a particle size of 0.1 μm or more exceeds 20%, so that the particle size of the polyorganosiloxane cannot be made extremely fine. When the amount is more than this range, coloration is observed on the graft polymer produced from the polyorganosiloxane latex. Such the amounts are not therefore preferred.

The temperature of the aqueous alkylbenzenesulfonic acid solution is an important factor determining the particle size of the polyorganosiloxane, and it needs to be 50° C. or more. When the temperature is less than 50° C., the degree of dissociation of the alkylbenzenesulfonic acid is so low that it is difficult to effectively generate silanol by bringing the organosiloxane, siloxane crosslinking agent and siloxane graftlinking agent into contact with the aqueous acid solution.

In the present invention, a method of polymerizing the organosiloxane by dropping its latex to the aqueous alkylbenzenesulfonic acid solution, is employed.

In dropping the latex, the rate of dropping needs to be sufficiently slow so that the following process surely occurs: The organosiloxane mixture contained in the preliminarily stirred latex comes into contact with the alkylbenzenesulfonic acid to form a silanol, this silanol dissolves in water and reaches the micelle of the alkylbenzenesulfonic acid catalyst or emulsifier, and condensation of the silanol proceeds in the micelle. When the latex is dropped faster than the rate at which the organosiloxane mixture forms the silanol which then dissolves in water, condensation of the silanol proceeds even in the falling drops of the latex. As a result, the resulting polyorganosiloxane particles in the latex become non-uniform in particle size distribution.

In the present invention, the silanol generated by contact of the organosiloxane mixture with aqueous alkylbenzenesulfonic acid solution reaches the micelle of the alkylbenzenesuifonic acid present in water, and begins condensation with other silanols by the dehydration action of the acid catalyst to produce the polyorganosiloxane. The micelle of the alkylbenzenesulfonic acid is of extremely small size, so that it is advantageous to produce particles which are extremely fine and have a small standard deviation and excellent single dispersibility. A heating time for the mixture of the latex and aqueous acid solution is usually 1 hour or more after the finish of dropping. The silanol generated from the organosiloxane comes into reaction almost completely by this heating, and at this stage, the latex is neutralized with an alkaline substance (e.g. sodium hydroxide, potassium hydroxide, aqueous ammonia) to stop the condensation. When the above mixture is maintained at a temperature of 30° C. or less for a long period of time, crosslinking between the silanols proceeds to increase the crosslinking density, so that in order to increase the crosslinking density of the polyorganosiloxane, the above mixture may be maintained at a temperature of 30° C. or less for about 5 to about 100 hours after the finish of reaction at a high temperature of 50° C. or more.

The compound rubber can be obtained by impregnating the polyorganosiloxane latex thus produced with an alkyl (meth)acrylate component comprising alkyl (meth)acrylate and a polyfunctional alkyl (meth)acrylate, and subsequently carrying out polymerization.

The alkyl (meth)acrylate includes alkyl acrylates (e.g. methyl acrylate, ethyl acrylate, n-propyl acrylate, n-butyl acrylate, 2-ethylhexyl acrylate) and alkyl methacrylates (e.g. hexyl methacrylate, 2-ethylhexyl methacrylate, n-lauryl methacrylate). Particularly, n-butyl acrylate is preferably used.

The polyfunctional alkyl (meth)acrylate includes, for example, allyl methacrylate, ethylene glycol dimethacrylate, propylene glycol dimethacrylate, 1,3-butylene glycol dimethacrylate, 1,4-butylene glycol dimethacrylate, triallyl cyanurate, triallyl isocyanurate and the like.

The amount of the polyfunctional alkyl (meth)acrylate used is 0.1 to 20 wt. %, preferably 0.5 to 10 wt. % of the alkyl (meth)acrylate component.

Both the above alkyl (meth)acrylates and polyfunctional alkyl (meth)acrylates are used alone or in mixture of two or more of the respective compounds.

The above alkyl (meth)acrylate component is added to the neutralized latex of the polyorganosiloxane component and polymerized by the action of a common radical polymerization initiator. This polymerization initiator includes peroxides, azo initiators and redox initiators which are a combination of oxidizing agent with reducing agent. Among them, the redox initiators are preferred. Particularly, sulfoxylate initiators which are a combination of ferrous sulfate, disodium ethylenediaminetetraacetate, Rongalite and hydroperoxide are preferred.

With the progress of the polymerization, there is obtained the latex of the compound rubber comprising the polyorganosiloxane component and polyalkyl (meth)acrylate rubber component which are substantially inseparable from each other. In the compound rubber of the present invention comprising the polyorganosiloxane and polyalkyl (meth)acrylate, the content of the polyorganosiloxane component is about 0.1 to about 90 wt. %. When the content is less than 0.1 wt. %, the characteristics of the polyorganosiloxane cannot be developed, and the impact resistance lowers. When the content exceeds 90 wt. %, the lowering of luster owing to the polyorganosiloxane occurs, and also the pigment colorability lowers.

In practicing the present invention, it is preferred to use the compound rubber obtained by compounding the polyorganosiloxane and polyalkyl (meth)acrylate rubber component. The former is produced with octamethyltetracyclosiloxane as dialkylorganosilane, tetraethoxysilane as the siloxane crosslinking agent, and γ-methacryloyloxypropyldimethoxymethylsilane as the siloxane graft-linking agent, and the latter comprises n-butyl acrylate and the polyfunctional methacrylate.

The compound rubber produced by emulsion polymerization in this manner can be graft-copolymerized with a vinyl monomer. Also, since the polyorganosiloxane component and polyalkyl (meth)acrylate rubber component are strongly entangled with each other, they cannot be separated from each other by extraction with common organic solvents (e.g. acetone, toluene, etc.). The gel content of this compound rubber measured by extraction with toluene at 90° C. for 12 hours is preferably 80 wt. % or more.

The vinyl monomer to be graft-polymerized onto this compound rubber includes various vinyl monomers such as aromatic alkenyl compounds (e.g. styrene, s-methylstyrene, vinyltoluene), methacrylates (e.g. methyl methacrylate, 2-ethylhexyl methacrylate), acrylates (e.g. methyl acrylate, ethyl acrylate, butyl acrylate), vinyl cyanide compounds (e.g. acrylonitrile, methacrylonitrile), epoxy group-containing vinyl compounds (e.g. glycidyl methacrylate), carboxylic group-containing vinyl compounds (e.g. methacrylic acid) and the like. These vinyl monomers are used alone or in combination of two or more of them.

In producing the compound rubber graft copolymer particle (hereinafter referred to as "graft compound rubber"), the proportions of the compound rubber and vinyl monomer are 10 to 95 wt. %, preferably 20 to 90 wt. % for the compound rubber, and 5 to 90 wt. %, preferably about 10 to about 80 wt. % for the vinyl monomer on the basis of the weight of the graft compound rubber obtained. When the content of the vinyl monomer is less than 5 wt. %, the graft compound rubber obtained shows no sufficient dispersibility in resin compositions which are a mixture of the graft compound rubber and other resins. When the content exceeds 90 wt. %, the impact strength lowers. Such the contents are not therefore preferred.

The graft compound rubber can be obtained by adding the vinyl monomer to the latex of the compound rubber, and polymerizing the vinyl monomer by the one-stage or multi-stage radical polymerization technique.

After the finish of the graft polymerization, the graft compound rubber can be separated and recovered by adding the latex to a hot water in which a metal salt (e.g. calcium chloride, aluminum sulfate) has been dissolved, to salt-out and coagulate the graft compound rubber.

This graft compound rubber can be extrusion-molded with well-known kneading machines. Such machines include extruders, injection molding machines, blow molding machines, inflation molding machines and the like. Further, dyes, pigments, stabilizers, fillers, flame retardants and the like may be incorporated into the graft compound rubber of the present invention as need arises.

The graft compound rubber of the present invention can be changed to resin compositions by mixing with other various thermoplastic resins. Such resins include polymers obtained by polymerizing one or more kinds of vinyl monomer selected from the group consisting of aromatic alkenyl compounds, vinyl cyanide compounds, methacrylates and acrylates, mixtures of a polyphenyleneether resin and a polystyrene resin, polyacetal resins, vinyl chloride, polyester resins, polycarbonate resins, polyamide resins, polyphenylenesulfide resins, polymers and copolymers of an ethylenic unsaturated monomer, and the like.

Those which are preferred as the polymers obtained by polymerizing one or more kinds of vinyl monomer selected from the group consisting of aromatic alkenyl compounds, vinyl cyanide compounds, methacrylates and acrylates, include a copolymer obtained by copolymerizing 70 wt. % of styrene with 30 wt. % of acrylonitrile, polymethyl methacrylate and the like.

These copolymers can be produced by suspension polymerization, emulsion polymerization, bulk polymerization and the like.

The polyphenyleneether resin is a homopolymer or copolymer represented by the following formula,

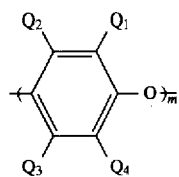

wherein $Q_1$ to $Q_4$ are independently selected from the group consisting of hydrogen and hydrocarbon, and m is an integer of 30 or more.

Specific examples of the polyphenyleneether resin include poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4phenylene) ether, poly(2-methyl-6-propyl-1,4-phenylene) ether, poly(2-ethyl-6-propyl-1,4-phenylene) ether, a copolymer of (2,6-dimethyl-1,4-phenylene) ether with (2,3,6-trimethyl-1,4-phenylene) ether, a copolymer of (2,6-diethyl-1,4-phenylene) ether with (2,3,6-trimethyl-1,4-phenylene) ether, a copolymer of (2,6-dimethyl-1,4-phenylene) ether with (2,3,6-triethyl-1,4-phenylene) ether, and the like. Particularly, poly(2,6-dimethyl-1,4-phenylene) ether and a copolymer of (2,6-dimethyl-1,4-phenylene) ether with (2,3,6-trimethyl-1,4-phenylene) ether are preferred, and poly(2,6-dimethyl-1,4-phenylene) ether is further more preferred. These polyphenyleneether resins are compatible with the polystyrene resin at any blending ratio.

The polymerization degree of the polyphenyleneether resin is not particularly limited, but those showing a reduced viscosity of 0.3 to 0.7 dl/g in a chloroform solvent at 25° C. are preferably used. Those having a reduced viscosity less than 0.3 dl/g tend to be poor in heat stability, and those having a reduced viscosity exceeding 0.7 dl/g tend to be damaged in moldability. These polyphenyleneether resins are used alone or in mixture of two or more of them.

The polystyrene resin used in the present invention is homopolymers composed of 50 wt. % or more of an aromatic vinyl monomer represented by the following formula, or copolymers composed of the above aromatic vinyl monomer and other copolymerizable vinyl monomer, the content of the aromatic vinyl monomer being 50 wt. % or more,

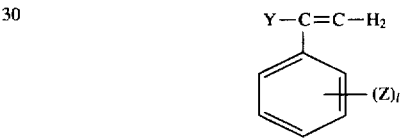

wherein Y represents a hydrogen atom or a $C_1$–$C_4$ alkyl group, Z represents a halogen atom or a $C_1$–$C_4$ alkyl group, and l represents 0 or an integer of 1 to 3.

Specific examples of the polystyrene resin include polystyrene, polychlorostyrene, polybromostyrene, poly-α-methylstyrene, styrene/acrylonitrile copolymers, styrene/methyl methacrylate copolymers, styrene/maleic anhydride copolymers, styrene/maleimide copolymers, styrene/N-phenylmaleimide copolymers, styrene/acrylonitrile/α-methylstyrene terpolymers and the like. Among them, polystyrene is particularly preferred.

The polyacetal resin includes polyacetal homopolymers and polyacetal copolymers.

The polyacetal homopolymer refers to a polymer comprising repetition of an oxymethylene unit ($CH_2O$) and obtained by homopolymerizing formaldehyde or trioxane. The polyacetal copolymer refers to a polymer having a structure in which an oxyalkylene unit represented by the following formula has been randomly inserted into a continuous chain comprising an oxymethylene unit,

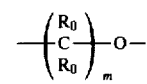

wherein $R_0$ represents a hydrogen atom or a $C_1$–$C_4$ alkyl group, and m represents an integer of 2 to 6.

The rate of the inserted oxyalkylene unit in the polyacetal copolymer is 0.05 to 50 moles, more preferably 0.1 to 20 moles based on 100 moles of the oxymethylene unit.

Examples of the oxyalkylene unit includes an oxyethylene unit, oxypropylene unit, oxytrimethylene unit, oxytetramethylene unit, oxybutylene unit, oxyphenylethylene unit and the like. Of these oxyethylene units, preferred components to enhance the performance of polyacetal compositions are a combination of the oxymethylene unit and oxytetramethylene unit.

The vinyl chloride resin is homopolymers of vinyl chloride and vinyl chloride polymers containing 50 wt. % or less of a vinyl monomer copolymerizable with vinyl chloride. The polymerization degree of this vinyl chloride resin is usually in a range of 400 to 2500. Other copolymerizable monomers include vinyl acetate, ethylene, acrylates, vinyl bromide and the like.

The polyester resin is composed of a $C_8$–$C_{22}$ aromatic dicarboxylic acid or aliphatic dicarboxylic acid and a $C_2$–$C_{22}$ alkylene glycol, cycloalkylene glycol or aralkylene glycol. In some cases, the polyester resin may contain a smaller amount of an aliphatic dicarboxylic acid such as adipic acid, sebacic acid and the like. Also, the polyester resin may contain a polyalkylene glycol such as polyethylene glycol, polytetramethylene glycol and the like. Thermoplastic polyesters may be used alone or in combination of two or more of them. Particularly preferred polyesters include polyethylene terephthalate, polytetramethylene terephthalate and the like.

As the polycarbonate resin are used those which are produced by the known methods. That is, the known methods include (1) ester interchange of a carbonic acid diester obtained from a monofunctional aromatic or aliphatic hydroxy compound with a dihydroxy compound, (2) ester interchange between the same dihydroxy compounds, or ester interchange of the dihydroxy compound with the bisalkyl- or bisarylcarbonate of other dihydroxy compound, (3) reaction of a dihydroxy compound with phosgene in the presence of an oxygen-binding agent, (4) reaction of a dihydroxy compound with the bischlorocarbonic acid ester of a dihydroxy compound in the presence of an oxygen-binding agent, and the like. Representative examples include a method in which bisphenol A is reacted with carbonyl chloride in the presence of an oxygen-binding agent and a solvent.

The polyamide resin includes polyamide resins derived from an aliphatic diamine (e.g. ethylenediamine, tetramethylenediamine, hexamethylenediamine, decamethylenediamine, dodecamethylenediamine, 2,2,4-trimethylhexamethylenediamine, etc.) or an aromatic diamine (e.g. p-xylylenediamine, etc.) with an aliphatic or aromatic dicarboxylic acid (e.g. adipic acid, suberic acid, sebacic acid, cyclohexanedicarboxylic acid, terephthalic acid, isophthalic acid, etc.), and polyamide resins obtained by ring-opening polymerization of lactams (e.g. ε-caprolactam, ω-dodecalactam, etc.). The polymerization degree of these polyamide resins is not particularly limited, but those having a relative viscosity ranging from 2.0 to 5.5 when 1 g of the polymer is dissolved in 100 ml of 98 wt. % sulfuric acid, are preferred.

The polyphenylenesulfide resin is a polymer having a repeating unit represented by the following general formula,

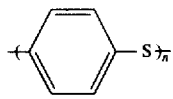

and those having a polymerization degree of 100 to 400 are preferred. This polyphenylenesulfide resin can be obtained by polymerization with p-dichlorobenzene and sodium sulfide as starting materials.

The (co)polymer of an ethylenic unsaturated monomer includes polyethylene, polypropylene and copolymers of ethylene or propylene. The copolymerizable component includes acrylic acid, methacrylic acid, maleic acid, esters thereof, maleic anhydride and the like. Preferably, these copolymerizable components are used in proportions of 10 wt. % or less based on polyethylene or polypropylene. The polymerization degree of (co)polymer of the ethylenic unsaturated monomer is preferably 300 to 6,000.

In the above resin compositions, the proportions of the graft compound rubber and various thermoplastic resins are not critical. It is desirable, however, that the resin compositions are constituted so that the content of the graft compound rubber is 5 to 95 wt. % based on the total weight of the resin compositions and that of the thermoplastic resins is 95 to 5 wt. % based on the same. When the content of the graft compound rubber is less than 5 wt. %, a sufficient effect is not obtained in improving the impact resistance of the resin compositions.

The present invention will be illustrated with reference to the following examples. In the referential examples and examples, "part" and "%" mean "part by weight" and "wt. %", respectively, unless otherwise stated.

In the referential examples, the particle size of the polyorganosiloxane in the latex was measured by the dynamic light scattering method. This method utilizes the Brownian motion of particles in a latex. When the particles in the latex is irradiated with laser ray, it shows fluctuation according to their particle size, so that the particle size can be calculated by interpreting the fluctuation. The number average particle size and particle size distribution were obtained using Model DLS-700 produced by Otsuka Denshi Co., Ltd.

The swelling degree and gel content of the crosslinked polyorganosiloxane were measured by the following method using the polyorganosiloxane obtained by dropping its latex to isopropanol to coagulate the latex and then drying.

The swelling degree was obtained by immersing the polyorganosiloxane in toluene at 23° C. for 48 hours to allow the polyorganosiloxane to absorb toluene, and dividing the weight of absorbed toluene by the weight of the polyorganosiloxane before the immersion. The gel content was obtained by extracting the polyorganosiloxane in toluene at 23° C. for 48 hours.

In the examples, Izod impact strength was measured by the method described in ASTM D 258.

Pigment colorability was measured according to JIS Z 8729 (a method of specifying an object color by the L*a*b* color system).

The number average particle size of the graft compound rubber and the volume fraction of particles of 0.1 μm or more in size were obtained by observing a super-thinly sliced test sample by means of a transmission electron microscope. This super-thinly sliced test sample was prepared by melt-mixing and pelletizing 90 parts of polymethyl methacrylate and 10 parts of the graft compound rubber in an extruder, pressing the resulting pellet into a test piece and then cutting out of the test piece with a microtome. Referential Example 1 (Production of silicone latex L-1)

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture. To this mixture was added 300 parts of distilled water in which 0.67 part of sodium dodecylbenzenesulfonate was dissolved. After stirring the resulting mixture for 2 minutes at 10,000 rpm with a homomixer, it was passed twice through a homogenizer under a pressure of 300 kg/cm² to obtain a stable preliminarily mixed organosiloxane latex.

Separately, 10 parts of dodecylbenzenesulfonic acid and 90 parts of distilled water were poured into a separable flask equipped with a reflux condenser to prepare a 10 wt. % aqueous dodecylbenzenesulfonic acid solution.

This aqueous solution was heated to 85° C., and under this condition, the preliminarily mixed organosiloxane latex was added dropwise thereto over 2 hours. After the finish of dropping, the solution was kept at the same temperature for 3 hours and then cooled. After the reaction product was kept at room temperature for 12 hours, it was neutralized with an aqueous sodium hydroxide solution.

The latex thus obtained was dried at 170° C. for 30 minutes, and its solid content was obtained to find it to be 18.2 wt. %. The organosiloxane particle in this latex had the properties: swelling degree, 15.6; gel content, 87.6%; number average particle size, 0.03 μm; and volume fraction of particles of 0.1 μm or more in size, 6.8%.

Referential Examples 2 to 5 (Production of Silicone latices L-2 to L-5)

The latices were produced in the same manner as in Referential Example 1 except that the concentration of the aqueous dodecylbenzenesulfonic acid solution was changed. The performance of the resulting latices were shown in Table 1.

siloxane mixture. Preliminary dispersion with a homomixer and emulsification dispersion with a homogenizer were carried out. This preliminarily mixed organosiloxane latex was heated at 80° C. for 5 hours, cooled and allowed to stand at 20° C for 48 hours. Thereafter, the latex was neutralized to a pH of 7.0 with an aqueous sodium hydroxide solution to complete polymerization. Thus, the polyorganosiloxane latex was obtained.

The conversion of this organosiloxane was 89.6%. The average particle size of the polyorganosiloxane rubber was 0.05 μm, and the volume fraction of particles of 0.1 μm or more in size was 67.3%.

Example 1

Production of graft compound rubber S-1

36.6 Parts of the polyorganosiloxane latex obtained in Referential Example 1 was taken into a separable flask, and 200 parts of distilled water was added and mixed. Thereafter, a mixture of 26.5 parts of butyl acrylate, 0.15 part of allyl

TABLE 1

|  | Amount of dodecylbenzene-sulfonic acid in the aqueous solution used as acid catalyst (wt. %) | Amount of preliminarily mixed organo-siloxane latex dropped (part) | Physical properties of polyorganosiloxane | |
| --- | --- | --- | --- | --- |
|  |  |  | Number average particle size (μm) | Volume fraction of particles larger than 0.1 μm (%) |
| Referential Example 2 (L-2) | 15 | 400 | 0.03 | 2.5 |
| Referential Example 3 (L-3) | 5 | 400 | 0.04 | 7.4 |
| Referential Example 4 (L-4) | 3 | 400 | 0.05 | 12.5 |
| Referential Example 5 (L-5) | 2 | 400 | 0.09 | 56.8 |

Referential Example 6

Production of Silicone latex L-6

A non-crosslinked silicone latex was obtained in the same manner as in Referential Example 1 except that the composition of the organosiloxane was 0.5 part of γ-methacryloyloxypropyldimethoxymethylsilane and 99.5 parts of octamethylcyclotetrasiloxane, and that the cooled reaction product was immediately neutralized with the aqueous sodium hydroxide solution without maintaining it at room temperature for 12 hours.

The solid content of the latex was 17.9%. The number average particle size was 0.04 μm, and the volume fraction of particles of 0.1 μm or more in size was 7.3%.

Referential Example 7

Production of silicone latex L-7

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture. Four parts of dodecylbenzenesulfonic acid and 2 parts of sodium dodecylbenzenesulfonate were dissolved in 200 parts of distilled water, and to the resulting solution was added 100 parts of the above methacrylate and 0.08 part of cumene hydroperoxide was added thereto.

The atmosphere in the separable flask was replaced by nitrogen by passing a nitrogen gas stream therethrough, and the inner temperature of the flask was raised to 60° C. At a point when the liquid temperature reached 60° C., an aqueous solution of 0.003 part of ferrous sulfate, 0.009 part of disodium ethylenediaminetetraacetate and 0.4 part of Rongalite in 10 parts of distilled water was added to start radical polymerization. The liquid temperature rose to 72° C. by polymerization of the acrylate component. This condition was held for 1 hour to complete polymerization of the acrylate component. Thus, the latex of a compound rubber comprising polyorganosiloxane and butyl acrylate was obtained.

After the liquid temperature of the latex lowered to 60° C., a mixed solution of 10 parts of acrylonitrile, 23.3 parts of styrene and 0.1 part of cumene hydroperoxide was added dropwise thereto over 2 hours to carry out polymerization. After the finish of dropping, the temperature of 60° C. was kept for 1 hour, and then a mixed solution of 10 parts of acrylonitrile, 23.3 parts of styrene, 0.03 part of n-octylmercaptan and 0.1 part of cumene hydroperoxide was again added dropwise thereto over 2 hours to carry out polymerization. After the finish of dropping, the temperature of 60° C. was kept for 2 hours, and then the reaction solution was cooled to obtain the latex of a graft compound rubber in which an acrylonitrile/styrene copolymer had been graft-polymerized onto a compound rubber comprising polydimethylsiloxane and polybutyl acrylate.

Separately, 500 parts of an aqueous solution in which aluminum sulfate was dissolved at a rate of 7.5 wt. %, was prepared. While heating this aqueous solution at 60° C. with stirring, 340 parts of the latex of the graft compound rubber was slowly added dropwise thereto to coagulate the latex. The coagulated product was separated, washed with water and dried to obtain the graft compound rubber.

To 100 parts of the graft compound rubber was added 0.5 part of carbon black (V-9 produced by Cabot Co.), and after mixing, this mixture was supplied to an extruder heated at 240° C. and kneaded to obtain a pellet. The pellet was molded into test pieces on an injection molding machine at a cylinder temperature of 230° C. and a mold temperature of 60° C. Using the test pieces, Izod impact strength and pigment colorability were measured.

The value of ¼" Izod impact strength was 28.2 kg·cm/cm, and the Rockwell hardness (R scale) was 78.6. The values of L*, a* and b* were 13.4, 1.5 and −0.2, respectively. Although a rubber was contained in large amounts, a good colorability was observed.

were carried out in the same manner as in Example 1. Using the resulting graft compound rubbers, addition of carbon black and extrusion-molding were carried out under the same conditions as in Example 1 to obtain test pieces.

The value of Izod impact strength, the values of L*, a* and b* and the number average particle size were shown in Table 2.

The graft compound rubbers obtained in Examples 2 to 5 showed good values of Izod impact strength and L*. In the case of the graft compound rubber having a large number average particle size of 0.12 μm obtained in Comparative Example 1, the value of L* was as large as 19.3, so that the colorability was poor. In the case of the graft compound rubber having a large width of particle size distribution, the volume of particles larger than 0.1 μm being 23.6%, obtained in Comparative Example 2, the value of Izod impact strength was as low as 14.9, and the value of L* was as large as 18.2, so that the colorability was poor.

TABLE 2

|  | Polyorgano-siloxane Latex | Izod impact strength 1/4", 23° C. (kg · cm/cm) | Pigment colorability | | | Graft compound rubber | |
|---|---|---|---|---|---|---|---|
|  |  |  | L* | a* | b* | Number average particle size (μm) | Volume fraction of particles larger than 0.1 μm (%) |
| Example 2 (S-2) | L-2 | 26.5 | 13.9 | 1.6 | −0.2 | 0.04 | 2.3 |
| Example 3 (S-3) | L-3 | 27.0 | 14.0 | 0.9 | 0.3 | 0.05 | 8.9 |
| Example 4 (S-4) | L-4 | 25.8 | 13.6 | 1.2 | 1.3 | 0.06 | 14.3 |
| Example 5 (S-5) | L-6 | 26.1 | 12.8 | 1.0 | 0.3 | 0.05 | 7.3 |
| Comparative Example 1 (T-1) | L-5 | 25.1 | 19.3 | 1.4 | −0.4 | 0.12 | 69.2 |
| Comparative Example 2 (T-2) | L-7 | 14.9 | 18.2 | 2.7 | −0.9 | 0.07 | 89.5 |

The condition of the particle size of the graft compound rubber was measured with a transmission electron microscope to find that the number average particle size was 0.04 μm, and the volume fraction of particles larger than 0.1 μm was 3.6%.

Examples 2 to 5 and Comparative Examples 1 and 2

Production of graft compound rubbers S-2 to S-5 and T-1 and T-2

Using the polyorganosiloxane latices obtained in Referential Examples 2 to 7, reaction for producing a compound rubber and graft polymerization onto the compound rubber Examples 6 to 9

Production of graft compound rubbers S-6 to S-9

Reaction for producing a compound rubber and graft polymerization onto the compound rubber were carried out in the same manner as in Example 1 except that the amounts of the polyorganosiloxane latex (L-1), butyl acrylate and allyl methacrylate to be poured into a separable flask were in proportions shown in Table 3. Using the resulting graft compound rubbers, addition of carbon black and extrusion-molding were carried out under the same conditions as in Example 1 to obtain test pieces. The values of Izod impact strength and number average particle size were shown in Table 3.

TABLE 3

| | Polyorgano-siloxane latex (part) | Butyl acrylate (part) | Allyl methacrylate (part) | Izod impact strength 1/4", 23° C. (kg · cm/cm) | Graft compound rubber | |
|---|---|---|---|---|---|---|
| | | | | | Number average particle size (μm) | Volume fraction of particles larger than 0.1 μm (%) |
| Example 6 (S-6) | 9.2 | 31.5 | 0.16 | 22.3 | 0.05 | 6.8 |
| Example 7 (S-7) | 18.3 | 29.9 | 0.15 | 24.1 | 0.04 | 4.7 |
| Example 8 (S-8) | 91.5 | 16.6 | 0.08 | 25.2 | 0.04 | 3.7 |
| Example 9 (S-9) | 122 | 11.0 | 0.06 | 25.7 | 0.03 | 3.2 |

Examples 10 to 12

Production of graft compound rubbers S-10 to S-12

Using 33.3 parts of a compound rubber obtained in the same manner as in Example 1, each of mixtures of 0.1 part of cumene hydroperoxide and varying amounts of vinyl monomers shown in Table 4 was grafted onto the compound rubber by radical polymerization in the same manner as in Example 1 to obtain a graft compound rubber. Although the kind of the vinyl monomer to be graft-polymerized onto the compound rubber was changed as styrene and methyl methacrylate, both the impact resistance and pigment colorability were good. Also, although the amount of the acrylonitrile/styrene copolymer, a graft component, was changed, both the impact resistance and pigment colorability were good.

sulfate, 0.003 part of disodium ethylenediaminetetraacetate and 0.24 part of Rongalite in 10 parts of distilled water was added to start radical polymerization. The liquid temperature rose to 82° C. by polymerization of the butyl acrylate mixed solution. This condition was held for 1 hour to complete polymerization of butyl acrylate. Thus, a compound rubber latex was obtained.

After the liquid temperature lowered to 75° C., the first-stage graft polymerization was carried out by adding dropwise a mixed solution of 17.5 parts of styrene, 7.5 parts of acrylonitrile and 0.3 part of tert-butyl hydroperoxide over 1 hour. After the finish of dropping, the temperature of 75° C. was kept for 1 hour. The second-stage graft polymerization was then carried out by adding dropwise a mixed solution of 17.5 parts of styrene, 7.5 parts of acrylonitrile, 0.3 part of tert-butyl hydroperoxide and 0.05 part of n-oc-

TABLE 4

| | Grafting monomer | | Izod impact strength 1/4", 23° C. (kg · cm/cm) | Pigment colorability | | | Graft compound rubber | |
|---|---|---|---|---|---|---|---|---|
| | | | | | | | Number average particle size (μm) | Volume fraction of particles larger than 0.1 μm (%) |
| | Kind | Part | | L* | a* | b* | | |
| Example 10 (S-10) | Styrene | 66.7 | 10.3 | 13.5 | 0.6 | −0.4 | 0.04 | |
| Example 11 (S-11) | Methyl methacrylate | 66.7 | 12.2 | 12.9 | 0.7 | −0.3 | 0.04 | |
| Example 12 (S-12) | Acrylonitrile | 10 | 31.5 | 13.6 | 1.0 | 0.6 | 0.05 | |
| | Styrene | 23.3 | | | | | | |

Example 13

Production of graft compound rubber S-13

54.9 Parts of the siloxane latex (L-1) was taken and put in a separable flask equipped with a stirrer, and 170 parts of distilled water was added thereto. Thereafter, a mixed solution of 39.2 parts of butyl acrylate, 0.8 part of allyl methacrylate and 0.12 part of tert-butyl hydroperoxide was added thereto and stirred for 30 minutes to impregnate the polyorganosiloxane particle with this solution. The atmosphere in the separable flask was replaced by nitrogen by passing a nitrogen gas stream therethrough, and the inner temperature was raised to 60° C. At a point when the liquid temperature reached 60° C., an aqueous solution of 0.001 part of ferrous tylmercaptan over 1 hour. After the finish of dropping, the temperature of 75° C. was kept for 1 hour to complete graft polymerization onto the compound rubber.

The resulting latex of the graft compound rubber was slowly added dropwise to 200 parts of water (25° C.) containing 7.5 wt. % of calcium chloride to coagulate the latex. After the coagulated product was separated and washed, it was dried at 75° C. for 16 hours to obtain 96.8 parts of the dry powder of the graft compound rubber. The number average particle size of this graft compound rubber was 0.05 μm, and the volume fraction of particles larger than 0.1 μm was 5.6%. Examples 14 and 15 and Comparative Example 3 (Production of graft compound rubbers S-14 and S-15, and T-3)

Various graft compound rubbers were obtained in the same manner as in Referential Example 2 except that the silicone latex (L-1), butyl acrylate (BA) and allyl methacrylate (AMA) were fed in proportions shown in Table 5.

TABLE 5

|  | Polyorgano-siloxane latex (part) | Butyl acrylate (part) | Allyl methacrylate (part) | Graft compound rubber | |
|---|---|---|---|---|---|
|  |  |  |  | Number average particle size (μm) | Volume fraction of particles larger than 0.1 μm (%) |
| Example 14 (S-14) | 164.7 | 19.6 | 0.4 | 0.04 | 5.1 |
| Example 15 (S-15) | 219.6 | 9.8 | 0.2 | 0.03 | 4.7 |
| Comparative Example 3 (T-3) | 274.5 | 0 | 0 | 0.02 | 3.3 |

Examples 16 to 18 and Comparative Example 4

Production of compositions U-1 to U-3 and V-1

Four kinds of resin composition were prepared by blending 53 wt. % of each of the graft compound rubbers S-13 to S-15 and T-4 and 47 wt. % of a copolymer obtained by copolymerizing 70 wt. % of styrene with 30 wt. % of acrylonitrile.

To 100 parts of each of these four resin compositions was added 0.5 part of carbon black (MCF-88 produced by Mitsubishi Chemical Industries, Ltd.), and after mixing, this mixture was supplied to a twin-screw extruder (ZSK-30 produced by Werner & Pfleiderer Co.) kept at a cylinder temperature of 230° C., melt-kneaded and pelletized. The resulting pellet was dried, supplied to an injection molding machine (Promat 165/75 produced by Sumitomo Heavy Industries, Ltd.) and injection-molded at a cylinder temperature of 230° C. and a mold temperature of 60° C. to obtain various test pieces. Using these test pieces, various physical properties were evaluated. The results were shown in Table 6.

In the same manner as in Example 13, carbon black was added to each of these five resin compositions, and the mixture was mixed, melt-kneaded and pelletized. The resulting pellet was dried and injection-molded into various test pieces. Using these test pieces, various physical properties were evaluated. The results were shown in Table 7.

TABLE 6

|  | Graft compound rubber | Surface hardness (R hardness) | Izod impact strength 1/4", 23° C. (kg · cm/cm) | Pigment colorability | | | Luster (%) |
|---|---|---|---|---|---|---|---|
|  |  |  |  | L* | a* | b* |  |
| Example 16 (U-1) | S-13 | 92.0 | 33.0 | 9.8 | −0.3 | −0.2 | 98 |
| Example 17 (U-2) | S-14 | 82.4 | 31.1 | 12.3 | −0.4 | −0.6 | 94 |
| Example 18 (U-3) | S-15 | 74.5 | 24.7 | 14.8 | −0.5 | −0.8 | 95 |
| Comparative Example 4 (V-1) | T-3 | 71.2 | 23.9 | 19.4 | −1.4 | −1.6 | 83 |

Examples 19 to 21 and Comparative Example 5

Production of compositions U-4 to U-6 and V-2

Five kinds of resin composition were prepared by blending the graft compound rubber S-13 obtained in Example 22 and a copolymer prepared by copolymerizing 70 wt. % of styrene with 30 wt. % of acrylonitrile in proportions shown

TABLE 7

| | Composition | | | Izod | | | | |
|---|---|---|---|---|---|---|---|---|
| | Graft compound rubber | | AN/St copolymer | Surface hardness (R hardness) | impact strength 1/4", 23° C. | Pigment colorability | | | Luster |
| | Kind | (part) | (part) | | (kg·cm/cm) | L* | a* | b* | (%) |
| Example 19 (U-4) | S-13 | 10 | 90 | 113.1 | 10.4 | 9.7 | −0.3 | −0.1 | 98 |
| Example 20 (U-5) | S-18 | 30 | 70 | 103.7 | 17.3 | 9.5 | −0.3 | −0.3 | 94 |
| Example 21 (U-6) | S-13 | 60 | 40 | 83.5 | 38.9 | 13.4 | −0.6 | −0.5 | 89 |
| Comparative Example 5 (V-2) | — | — | 100 | 120.0 | 1.7 | 8.8 | −0.3 | 0.2 | 99 |

Example 22

Production of graft compound rubber S-16

54.9 Parts of the silicone latex (L-1) was taken and put in a separable flask equipped with a stirrer, and 340 parts of distilled water was added thereto. Thereafter, a mixed solution of 39.2 parts of butyl acrylate, 0.8 part of allyl methacrylate and 0.12 part of cumene hydroperoxide was added thereto and stirred for 30 minutes to impregnate the polyorganosiloxane rubber particle with this solution. The atmosphere in the separable flask was replaced by nitrogen by passing a nitrogen gas stream therethrough, and the inner temperature was raised to 60° C. At a point when the liquid temperature reached 60° C., an aqueous solution of 0.001 part of ferrous sulfate, 0.003 part of disodium ethylenediaminetetraacetate and 0.24 part of Rongalite in 10 parts of distilled water was added to start radical polymerization. The liquid temperature rose to 72° C. by polymerization of the butyl acrylate mixed solution. This condition was held for 1 hour to complete polymerization of butyl acrylate. Thus, a compound rubber latex was obtained.

After the liquid temperature lowered to 60° C., a mixed solution of 50 parts of styrene and 0.25 part of cumene hydroperoxide was added dropwise thereto over 1 hour to carry out polymerization. After the finish of dropping, the temperature of 60° C. was kept for 1 hour to complete graft polymerization onto the compound rubber.

The resulting latex of the graft compound rubber was slowly added dropwise to 200 parts of water (25° C.) containing 7.5 wt. % of calcium chloride to coagulate the latex. After the coagulated product was separated and washed, it was dried at 75° C. for 16 hours to obtain 96.8 parts of the dry powder of the graft compound rubber (S-16). The number average particle size of this graft compound rubber was 0.06 μm, and the volume fraction of particles larger than 0.1 μm was 5.6%.

Examples 23 to 25

Production of graft compound rubbers S-17 to S-19

Various graft compound rubbers S-17 to S-19 were obtained in the same manner as in Example 22 except that the kind and amount of the vinyl monomer to be graft-polymerized were changed as shown in Table 8.

TABLE 8

| | | | Graft compound rubber | |
|---|---|---|---|---|
| | Grafting monomer | | Number average particle size | Volume fraction of particles larger than |
| | Kind | Part | (μm) | 0.1 μm (%) |
| Example 23 (S-17) | Methyl methacrylate Styrene | 40 10 | 0.03 | 3.6 |
| Example 24 (S-18) | Methyl methacrylate Styrene | 20 30 | 0.04 | 4.1 |
| Example 25 (S-19) | Methyl methacrylate Styrene | 10 40 | 0.05 | 5.7 |

Examples 26 to 29

Production of compositions U-7 to U-10

Four kinds of resin composition were prepared by blending 15 wt. % of each of the graft compound rubbers S-16 to S-19, 40 wt. % of poly(2,6-dimethyl-1,4-phenylene) ether having a reduced viscosity ($\eta_{sp/c}$) of 0.59 dl/g when measured in chloroform at 25° C., and 45 wt. % of a polystyrene having a melt index of 30 g/10 min at 200° C. under a load of 5 kg. To 100 parts of each of these four resin compositions was added 0.5 part of carbon black (V-9 produced by Cabot Ltd.), and after mixing, this mixture was supplied to a twin-screw extruder (ZSK-30 produced by Werner & Pfleiderer Co.) kept at a cylinder temperature of 280° C., melt-kneaded and pelletized. The resulting pellet was dried, supplied to an injection molding machine (Promar 165/75 produced by Sumitomo Heavy Industries, Ltd.) and injection-molded at a cylinder temperature of 280° C. and a mold temperature of 60° C. to obtain various test pieces. Using these test pieces, various physical properties were evaluated. The results were shown in Table 9.

coagulate the latex. After the coagulated product was separated and washed, it was dried at 75° C. for 16 hours to obtain 96.8 parts of the dry powder of the graft compound rubber. The number average particle size of this graft compound rubber was 0.05 μm, and the volume fraction of particles larger than 0.1 μm was 5.6%.

TABLE 9

|  | Graft compound rubber | Bending strength (kg/cm$^2$) | Izod impact strength 1/4", 23° C. (kg · cm/cm) | Pigment colorability | | | Luster (%) |
|---|---|---|---|---|---|---|---|
|  |  |  |  | L* | a* | b* |  |
| Example 26 (U-7) | S-16 | 910 | 19.9 | 10.8 | −0.3 | −0.2 | 99 |
| Example 27 (U-8) | S-17 | 920 | 17.7 | 15.3 | 0.2 | −0.8 | 97 |
| Example 28 (U-9) | S-18 | 900 | 18.2 | 14.8 | −0.5 | −0.7 | 98 |
| Example 29 (U-10) | S-19 | 920 | 19.8 | 12.5 | −0.3 | −0.6 | 99 |

Example 30

Production of graft compound rubber S-20

54.9 Parts of the silicone latex (L-1) was taken and put in a separable flask equipped with a stirrer, and 170 parts of distilled water was added thereto. Thereafter, a mixed solution of 58.8 parts of butyl acrylate, 1.2 parts of allyl methacrylate and 0.12 part of tert-butyl hydroperoxide was added thereto and stirred for 30 minutes to impregnate the polyorganosiloxane rubber particle with this solution. The atmosphere in the separable flask was replaced by nitrogen by passing a nitrogen gas stream therethrough, and the inner temperature was raised to 60° C. At a point when the liquid temperature reached 60° C., an aqueous solution of 0.001 part of ferrous sulfate, 0.003 part of disodium ethylenediaminetetraacetate and 0.24 part of Rongalite in 10 parts of distilled water was added to start radical polymerization. The liquid temperature rose to 82° C. by polymerization of the butyl acrylate mixed solution. This condition was held for 1 hour to complete polymerization of butyl acrylate. Thus, a compound rubber latex was obtained. After the liquid temperature lowered to 75° C., a mixed solution of 0.12 part of tert-butyl hydroperoxide and 30 parts of methyl methacrylate was added dropwise to the compound rubber latex over 15 minutes. Thereafter, the temperature was kept at 70° C. for 4 hours to complete graft polymerization onto the compound rubber. The resulting latex of the graft compound rubber was slowly added dropwise to 200 parts of water (25° C.) containing 1.5 wt. % of calcium chloride to Examples 31 to 33

Production of graft compound rubbers S-21 to S-23

Graft compound rubbers S-21 to S-23 were prepared in the same manner as in Example 30 except that the silicone latex, butyl acrylate (BA) and allyl methacrylate (AMA) were fed in proportions shown in Table 10.

TABLE 10

|  |  |  |  | Graft compound rubber | |
|---|---|---|---|---|---|
|  | Polyorgano-siloxane latex (part) | Butyl acrylate (part) | Allyl methacrylate (part) | Number average particle size (μm) | Volume fraction of particles larger than 0.1 μm (%) |
| Example 31 (S-21) | 27.5 | 64.2 | 0.8 | 0.04 | 5.1 |
| Example 32 (S-22) | 82.4 | 54.3 | 0.7 | 0.03 | 4.7 |
| Example 33 (S-23) | 192.2 | 34.6 | 0.4 | 0.02 | 3.3 |

Examples 34 to 38

Production of compositions U-11 to U-15

Various resin compositions were prepared from the graft compound rubber S-20 obtained in Example 30 and a homo-type polyacetal having an MI (melt index) of 18.2 g/10 min or a random copolymer-type polyacetal comprising 98 wt. % of trioxane and 2 wt. % of ethylene oxide having an MI of 8.2 g/10 min. To 100 parts of each of these resin compositions was added 0.5 part of carbon black (MCF-88 produced by Mitsubishi Chemical Industries, Ltd.), and after mixing, this mixture was supplied to a twin-screw extruder (ZSK-30 produced by Werner & Pfleiderer Co.) kept at a cylinder temperature of 200° C., melt-kneaded and pelletized. The resulting pellet was dried, supplied to an injection molding machine (Promat 165/75 produced by Sumitomo Heavy Industries, Ltd.) and injection-molded at a cylinder temperature of 200° C. and a mold temperature of 60° C. to obtain various test pieces. Using these test pieces, various physical properties were evaluated. The results were shown in Table 11. It was found that the resin compositions of the graft compound rubber with the polyacetal resins had excellent impact resistance and mechanical characteristics as shown in Examples 34 to 38.

Examples 39 to 41

Production of compositions U-16 to U-18

Twenty parts of each of the graft compound rubbers (S-21 to S-23) and 80 parts of the homo-type polyacetal were mixed in the same manner as in Example 34 and pelletized with a single-screw extruder. The resulting pellet was dried and supplied to an injection molding machine to prepare test pieces for measurement. Using these test pieces, Izod impact strength and flexural modulus were measured. The results were shown in Table 11.

Examples 44 to 48 and Comparative Example 7

Production of compositions U-19 to U-23 and V-3

A polyvinyl chloride resin having a polymerization degree of 700 (hereinafter referred to as PVC), each of the graft compound rubbers S-20, S-24 and S-25 and the graft silicone rubber T-4 were mixed in proportions shown in Table 13. One hundred parts of each of the resulting mixtures was mixed with 3.5 parts of dibutyltin maleate, 0.8 part of stearyl alcohol, 0.4 part of Metaprene P-700 (produced by Mitsubishi Rayon Co., Ltd.) and 0.5 part of carbon black (MCF-88 produced by Mitsubishi Chemical Industries, Ltd.). After mixing for 10 minutes on a Henschel mixer, the mixture was extruded into 6 m/m square rods at 190° C. on a 25 m/m$\phi$ profile extruder. A V-notch (R=0.25 m/m) was applied to the rods, and Izod impact strength was measured. The results were shown in Table 13. Separately, the material for extrusion was kneaded for 5 minutes on a mixing roll and pressure-molded into test pieces at 180° C. under a pressure of 100 kg/cm$^2$. The color was measured using the test pieces.

TABLE 11

|  | Composition | | | Izod impact strength 1/4", 23° C. (kg · cm/cm) | pigment colorability L* | Flexural modulus (kg/cm$^2$) |
|---|---|---|---|---|---|---|
|  | Graft compound rubber | | Poly-acetal (part) | | | |
|  | Kind | (Part) | | | | |
| Example 34 (U-11) | S-20 | 10 | 90 | 15 | 11.4 | 28000 |
| Example 35 (U-12) | S-20 | 20 | 80 | 30 | 12.6 | 24700 |
| Example 36 (U-13) | S-20 | 30 | 70 | 48 | 13.2 | 23300 |
| Example 37 (U-14) | S-20 | 20 | 80* | 35 | 11.9 | 25200 |
| Example 38 (U-15) | S-20 | 30 | 70* | 57 | 13.8 | 22100 |
| Example 39 (U-16) | S-21 | 20 | 80 | 29 | 12.4 | 25000 |
| Example 40 (U-17) | S-22 | 20 | 80 | 28 | 13.3 | 24800 |
| Example 41 (U-18) | S-23 | 20 | 80 | 23 | 14.5 | 22700 |

Note: In the column of Polyacetal, an asterisk (*) means a copolymer-type polyacetal, and no asterisk means a homo-type polyacetal.

Examples 42 and 43 and Comparative Example 6

Production of graft compound rubbers S-24 and S-25 and graft silicone rubber T-4

Graft compound rubbers S-24 and S-25 and a graft silicone rubber T-4 were obtained in the same manner as in Example 39 except that the silicone latex (L-1), butyl acrylate (BA) and allyl methacrylate (AMA) were fed in proportions shown in Table 12.

The results were shown in Table 13.

TABLE 12

|  | Polyorgano-siloxane latex (part) | Butyl acrylate (part) | Allyl methacrylate (part) | Graft compound rubber | |
|---|---|---|---|---|---|
|  |  |  |  | Number average particle size (μm) | Volume fraction of particles later than 0.1 μm (%) |
| Example 42 (S-24) | 27.5 | 63.7 | 1.3 | 0.06 | 8.6 |
| Example 43 (S-25) | 192.3 | 34.3 | 0.7 | 0.04 | 4.8 |
| Comparative Example 6 (T-4) | 384.6 | 0 | 0 | 0.03 | 0.1 |

TABLE 13

| | Composition | | | Izod impact strength (kg · cm/cm) | | | | |
|---|---|---|---|---|---|---|---|---|
| | Graft compound rubber | | PVC | Measurement temperature, | Measurement temperature, | Pigment colorability | | |
| | Kind | (Part) | (part) | 0° C. | 23° C. | L* | a* | b* |
| Example 44 (U-19) | S-20 | 10 | 90 | 13 | 145 | 12.5 | −0.9 | 1.2 |
| Example 45 (U-20) | S-20 | 15 | 85 | 110 | 153 | 13.1 | −0.3 | 1.1 |
| Example 46 (U-21) | S-20 | 20 | 80 | 126 | 156 | 14.3 | −0.5 | 1.8 |
| Example 47 (U-22) | S-24 | 10 | 90 | 11 | 128 | 12.9 | 0.7 | 1.8 |
| Example 48 (U-23) | S-25 | 10 | 90 | 15 | 151 | 11.6 | 0.5 | 1.6 |
| Comparative Example 7 (V-3) | T-4 | 10 | 90 | 9 | 59 | 19.7 | 1.6 | 2.3 |

Examples 49 to 53 and Comparative Example 8

Production of compositions U-24 to U-28 and V-4

A polycarbonate resin (Novalex 7022A produced by Mitsubishi Chemical Industries, Ltd.), each of the graft compound rubbers S-29, S-33 and S-34 and the graft silicone rubber T-4 were mixed in proportions shown in Table 14. And further, every mixture was mixed with 0.5 part of carbon black (MCF-88 produced by Mitsubishi Chemical Industries, Ltd.). The resulting mixture was supplied to a 30 m/mφ twin-screw extruder (ZSK-30 produced by Werner & Pfleiderer Co.), melt-kneaded at a cylinder temperature of 260° C. and pelletized. The resulting pellet was dried, supplied to an injection molding machine (Promat 165/75 produced by Sumitomo Heavy Industries, Ltd.) and injection-molded at a cylinder temperature of 250° C. and a mold temperature of 60° C. to obtain various test pieces for evaluation. The results of evaluation with these test pieces were shown in Table 14.

As is apparent from the results of Examples 49 to 51, the graft compound rubber S-20 showed a high impact strength by mixing with the polycarbonate resin, and also it showed a good pigment colorability when colored with the carbon black. Further, even when the proportion of polyorganosiloxane rubber to polybutyl acrylate rubber in the graft compound rubbers was changed in a wide range as shown in Examples 52 and 53, it was confirmed that the resin compositions of the present invention showed good performances.

However, the graft silicone rubber T-4 in Comparative Example 8 was poor in both the development of impact resistance and pigment colorability.

TABLE 14

| | Composition | | | Izod impact strength (kg · cm/cm) | | | | |
|---|---|---|---|---|---|---|---|---|
| | Graft compound rubber | | Polycarbonate | Measurement temperature | Measurement temperature | Pigment colorability | | |
| | Kind | (part) | (part) | −30° C. | 23° C. | L* | a* | b* |
| Example 49 (U-24) | S-20 | 5 | 95 | 12 | 64 | 10.5 | −0.8 | 1.3 |
| Example 50 (U-25) | S-20 | 10 | 90 | 23 | 63 | 11.8 | −0.6 | 1.5 |
| Example 51 (U-26) | S-20 | 15 | 85 | 30 | 60 | 13.5 | −0.9 | 0.8 |
| Example 52 (U-27) | S-24 | 10 | 90 | 19 | 61 | 10.9 | 0.3 | 2.3 |
| Example 53 (U-28) | S-25 | 10 | 90 | 25 | 64 | 12.6 | 0.8 | 1.5 |
| Comparative Example 8 (V-4) | T-4 | 10 | 90 | 8 | 52 | 20.6 | −1.5 | −1.9 |

Examples 54 and 55

Production of compositions U-29 and U-30

A polycarbonate resin (Novalex 7022A produced by Mitsubishi Chemical Industries, Ltd.), a polyester resin (Tufpet PBT: N-1000 produced by Mitsubishi Rayon Co., Ltd.) and the graft compound rubber S-20 were mixed in proportions shown in Table 15. And further, every mixture was mixed with 0.5 part of carbon black (MCF 88 produced by Mitsubishi chemical Industries, Ltd.). The resulting mixture was supplied to a 30 m/mφ twin-screw extruder (ZSK-30 produced by Werner & Pfleiderer Co.), melt-kneaded at a cylinder temperature of 260° C. and pelletized. The resulting pellet was dried, supplied to an injection molding machine (Promat 165/75 produced by Sumitomo Heavy Industries, Ltd.) and injection-molded at a cylinder temperature of 250° C. and a mold temperature of 60° C. to obtain various test pieces for evaluation. The results of evaluation with these test pieces were shown in Table 15.

As is apparent from the results in Table 15, the resin compositions of the present invention are excellent in impact resistance at both room temperature and low temperature.

Sumitomo Heavy Industries, Ltd.) and injection-molded at a cylinder temperature of 230° C. and a mold temperature of 60° C. to obtain various test pieces for evaluation. The results of evaluation with these test pieces were shown in Table 16.

As is apparent from the results of Examples 56 to 60, the graft compound rubber S-20 showed a high impact strength by mixing with the polyester resin, and also it showed a good pigment colorability when colored with the carbon black. Further, even when the proportion of polyorganosiloxane rubber to polybutyl acrylate rubber in the graft compound rubbers was changed in a wide range as shown in Examples 56 to 60, it was confirmed that the resin compositions of the present invention showed good performances.

However, the graft silicone rubber in Comparative Example 9 was poor in both the development of impact resistance and pigment colorability.

TABLE 15

| | Composition | | | Izod impact strength | | | | |
| | Graft | | | (kg · cm/cm) | | | | |
| | compound rubber | | PEs | PC | Measurement temperature | Measurement temperature | Pigment colorability | | |
| | Kind | (part) | (part) | (part) | −30° C. | 23° C. | L* | a* | b* |
| Example 54 (U-29) | S-20 | 10 | 30 | 60 | 15 | 54 | 12.9 | −0.5 | −2.2 |
| Example 55 (U-30) | S-20 | 10 | 60 | 30 | 12 | 47 | 12.6 | −0.8 | −2.0 |

Examples 56 to 60 and Comparative Example 9

Production of compositions U-31 to U-35 and V-5

A polyester resin (Tufpet PBT: N-1000 produced by Mitsubishi Rayon Co., Ltd.), each of the graft compound rubbers S-20, S-24 and S-25 and the graft silicone rubber T-4 were mixed in proportions shown in Table 16. And further, every mixture was mixed with 0.5 part of carbon black (MCF 88 produced by Mitsubishi Chemical Industries, Ltd.).

The resulting mixture was supplied to a 30 m/mφ twin-screw extruder (ZSK-30 produced by Werner & Pfleiderer Co.), melt-kneaded at a cylinder temperature of 240° C. and pelletized. The resulting pellet was dried, supplied to an injection molding machine (Promar 165/75 produced by

TABLE 16

| | Composition | | | Izod impact strength | | | | |
| | Graft | | | (kg · cm/cm) | | | | |
| | compound rubber | | PBT resin N-1000 | Measurement temperature | Measurement temperature | Pigment colorability | | |
| | Kind | (part) | (part) | −30° C. | 23° C. | L* | a* | b* |
| Example 56 (U-24) | S-20 | 10 | 90 | 5 | 11 | 11.8 | −0.6 | 0.9 |
| Example 57 (U-25) | S-20 | 15 | 85 | 6 | 17 | 12.1 | 0.3 | 1.0 |
| Example 58 (U-26) | S-20 | 20 | 80 | 11 | 28 | 13.2 | −0.4 | 0.7 |
| Example 59 (U-27) | S-24 | 15 | 85 | 5 | 15 | 11.4 | 0.6 | 1.9 |
| Example 60 (U-28) | S-25 | 15 | 85 | 8 | 21 | 11.9 | 0.8 | 1.3 |
| Comparative Example 9 (V-4) | T-5 | 15 | 85 | 3 | 5 | 19.1 | 1.8 | 2.1 |

Examples 61 and 62

Production of compositions U-36 and U-37

The following two kinds of polyester resin were used in combination: (1) a polyester thermoplastic elastomer obtained by block-copolymerizing 70 wt. % of polytetramethylene terephthalate with 30 wt. % of polytetramethyleneetherglycol having an average molecular weight of 1,000 and (2) Tufpet PBT: N-1000 produced by Mitsubishi Rayon Co., Ltd. These resins and the graft compound rubber S-20 were mixed in proportions shown in Table 17.

Test pieces for evaluation were prepared with the same amount of the carbon black and under the same pelletizing condition as in Example 56. The results shown in Table 17 were obtained.

As is apparent from the results in Table 17, the resin compositions of the present invention are excellent in impact resistance at both room temperature and low temperature.

S-25 and the graft silicone rubber T-4 were mixed in proportions shown in Table 18. And further, every mixture was mixed with 0.5 part of carbon black (MCF 88 produced by Mitsubishi Chemical Industries, Ltd.).

The resulting mixture was supplied to a 30 m/m$\phi$ twin-screw extruder (ZSK-30 produced by Werner & Pfleiderer Co.), melt-kneaded at a cylinder temperature of 220° C. to 300° C. and pelletized. The resulting pellet was dried, supplied to an injection molding machine (Promat 165/75 produced by Sumitomo Heavy Industries, Ltd.) and injection-molded at a cylinder temperature of 220° C. to 300° C. and a mold temperature of 60° C. to obtain various test pieces for evaluation. The results of evaluation with these test pieces were shown in Table 18.

As is apparent from the results of Example 63, the graft compound rubber S-20 showed a high impact strength by mixing with the polyamide resin, and also it showed a good pigment colorability when colored with the carbon black. Further, even when the proportion of polyorganosiloxane

TABLE 17

| | Composition | | | Izod impact strength (kg · cm/cm) | | Pigment colorability | | |
|---|---|---|---|---|---|---|---|---|
| | Graft compound rubber | PBT N-1000 | PEs elastomer | Measurement temperature | Measurement temperature | | | |
| | Kind | (part) | (part) | (part) | −30° C. | 23° C. | L* | a* | b* |
| Example 61 (U-36) | S-20 | 15 | 75 | 10 | 18 | 57 | 13.5 | −0.9 | 1.8 |
| Example 62 (U-37) | S-20 | 15 | 65 | 20 | 32 | 59 | 12.6 | −1.1 | 2.3 |

Examples 63 to 67 and Comparative Example 10

Production of compositions U-38 to U-42 and V-6

A polyamide resin (Novamid 1012C produced by Mitsubishi Chemical Industries, Ltd.), a polyphenylenesulfide resin (Tohpren T-4 produced by Tohpren Co.), a copolymer of an ethylenic unsaturated monomer, modified polyolefin, (MODIC P-10B produced by Mitsubishi Petrochemical Co., Ltd.), each of the graft compound rubbers S-20, S-24 and rubber to polybutyl acrylate rubber in the graft compound rubbers was changed in a wide range as shown in Examples 64 and 65, it was confirmed that the resin compositions of the present invention showed good performances.

However, the graft silicone rubber in Comparative Example 10 was poor in both the development of impact resistance and pigment colorability.

As is shown in Examples 66 and 67, the resin compositions with the polyphenylenesulfide or modified polyolefin showed good impact resistance and colorability.

TABLE 18

| | Composition | | | | | Izod impact strength (kg · cm/cm) | | Pigment colorability | | |
|---|---|---|---|---|---|---|---|---|---|---|
| | Graft compound rubber | | Polyamide | PPS | Modified poly-olefin | Measurement temperature | Measurement temperature | | | |
| | Kind | (part) | (part) | (part) | (part) | −30° C. | 23° C. | L* | a* | b* |
| Example 63 (U-38) | S-20 | 20 | 80 | — | — | 19 | 93 | 11.6 | 2.1 | −1.5 |
| Example 64 (U-39) | S-24 | 20 | 80 | — | — | 16 | 81 | 10.9 | 1.8 | −1.2 |
| Example 65 (U-40) | S-25 | 20 | 80 | — | — | 24 | 95 | 10.7 | 1.3 | −1.9 |
| Comparative Example 10 (V-6) | T-4 | 20 | 80 | — | — | 5 | 32 | 20.1 | −1.8 | −2.0 |
| Example 66 (U-41) | S-20 | 20 | — | 80 | — | 12 | 21 | 12.0 | −1.0 | −2.2 |
| Example 67 (U-42) | S-20 | 20 | — | — | 80 | 10 | 31 | 13.1 | 1.3 | −2.0 |

Note: PPS: Polyphenylenesulfide

INDUSTRIAL APPLICABILITY

As described above, the graft compound rubber and its composition of the present invention have excellent pigment colorability and an extremely high impact resistance, so that they have characteristics that development of their wider application becomes possible.

We claim:

1. Graft copolymer particles obtained by graft-polymerizing one or more kinds of vinyl monomer onto a compound rubber comprising a polyorganosiloxane component and an alkyl (meth)acrylate rubber component, which graft copolymer particle has a number average particle size of 0.01 to 0.07 μm, the volume of particles larger than 0.10 μm being 2.3% to 20% of the whole particle volume.

2. Graft copolymer particles according to claim 1, wherein the volume of particles larger than 0.10 μm is 2.3% to 10% or less of the whole particle volume.

3. Graft copolymer particles according to claim 1, wherein the number average particle size is 0.01 to 0.06 μm, and the volume of particles larger than 0.10 μm is 2.3% to 20% or less of the whole particle volume.

4. Graft copolymer particles according to claim 1, wherein the alkyl (meth)acrylate rubber component comprises alkyl (meth)acrylate and a polyfunctional alkyl-(meth)acrylate.

5. A method for producing graft copolymer particles according to claim 1, wherein one or more kinds of vinyl monomer are graft-polymerized onto a compound rubber obtained by polymerizing an alkyl (meth)acrylate compound rubber obtained by polymerizing an alkyl (meth)acrylate component comprising alkyl (meth)acrylate and a polyfunctional alkyl (meth)acrylate with polyorganosiloxane particles having a number average particle size of 0.003 to 0.06 μm, the volume of particles larger than 0.10 μm being 2.3% to 20% of the whole particle volume.

6. A method for producing graft copolymer particles according to claim 5, wherein the polyorganosiloxane is obtained by emulsion-polymerizing an organosiloxane containing a dialkylorganosiloxane as a main component.

7. A thermoplastic resin composition comprising a graft copolymer (A) according to claim 1 and a thermoplastic resin (B) selected from the group consisting of polymers obtained by polymerizing one or more kinds of monomer selected from the group consisting of aromatic alkenyl compounds, methacrylates, acrylates and vinyl cyanide compounds; mixtures of a polyphenylene-ether resin and a polystyrene resin; polyacetal resins; vinyl chloride resins; polyester resins; polycarbonate resins; polyamide resins; polyphenylenesulfide resins and (co)polymers of an ethylenic unsaturated monomer.

* * * * *